United States Patent Office 3,657,308
Patented Apr. 18, 1972

3,657,308
CATALYTIC CARBONYLATION OF AROMATIC NITRO COMPOUNDS IN THE PRESENCE OF ORGANIC CARBONATES
Ehrenfried H. Kober, Hamden, and Wilhelm J. Schnabel, Branford, Conn., assignors to Olin Mathieson Chemical Corporation
No Drawing. Filed Apr. 16, 1969, Ser. No. 816,836
Int. Cl. C07c 119/04
U.S. Cl. 260—453 PC                    15 Claims

ABSTRACT OF THE DISCLOSURE

In the process for preparing an organic isocyanate by reacting an organic nitro compound with carbon monoxide in the presence of a catalyst, improved yields of the organic isocyanate are obtained and contamination of the isocyanate by products derived from ortho-dinitro compounds is supressed when the reaction is carried out in the presence of an organic carbonate. In addition, when the catalyst is a noble metal halide complex of Lewis base such as pyridine or isoquinoline, decomposition of the catalyst complex is diminished.

---

This invention relates to a novel catalyst system useful in the preparation of organic isocyanates from organic nitro compounds, and an improved method for preparing organic isocyanates.

Organic isocyanates are used extensively in the preparation of urethane foams, coatings, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially because no more than trace amounts of organic isocyanates are formed when an organic nitro compound such as nitrobenzene or dinitrotoluene are reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgian Pat. No. 672,405 entitled "Process For The Preparation Of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

An additional problem encountered in preparing organic diisocyanates, such as toluene diisocyanates, is that frequently the product is contaminated with impurities which are formed from ortho-isomers. These ortho-isomers derived impurities give rise to quality problems and are costly to remove from the desired isocyanates.

Furthermore, when certain Lewis bases are complexed with certain noble metal halides, as defined more fully below, to form a complex which is used as the reaction catalyst, there is at times a significant decomposition of the expensive catalyst complex, even though there may be relatively high conversion of the organic nitro compound and a relatively high yield of organic isocyanates.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

It is another object of this invention to provide a process for preparing organic diisocyanates which are free of ortho-isomer derived impurities.

A further object of the invention is to provide a novel process for preparing toluene diisocyanate which is substantially free of ortho-isomer derived impurities.

Still another object of this invention is to provide a novel process for preparing organic isocyanates, using a complex of a noble metal halide and a Lewis base as a catalyst, in which decomposition of the catalyst during the reaction is markedly suppressed.

These and other objects of the invention will be apparent from the following detailed description thereof.

It has now been discovered that the above-mentioned objects are accomplished in the process for preparing organic isocyanates by reacting organic nitro compounds with carbon monoxide at an elevated temperature and elevated pressure in the presence of a catalyst, when the reaction is carried out in the presence of at least one organic carbonate.

Any organic nitro compound capable of being converted to an organic isocyanate may be employed as a reactant. Generally, aromatic, cycloaliphatic, and aliphatic mono- or polynitro compounds, which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) AROMATIC NITRO COMPOUNDS (a) Nitrobenzene
(b) Nitronaphthalene
(c) Nitroanthracenes
(d) Nitrobiphenyls
(e) Bis(nitrophenylmethanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) NITROCYCLOALKANES (a) Nitrocyclobutane
(b) Nitrocyclopentane
(c) Nitrocyclohexane
(d) Dinitrocyclohexanes
(e) Bis(nitrocyclohexyl)methanes (III) NITROALKANES (a) Nitromethane
(b) Nitroethane
(c) Nitropropane
(d) Nitrobutanes
(e) Nitrohexanes
(f) Nitrooctanes
(g) Nitrooctadecanes
(h) Bis-(nitromethyl)benzenes
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

(1) o-Nitrotoluene
(2) m-Nitrotoluene
(3) p-Nitrotoluene
(4) o-Nitro-p-xylene
(5) 2-Methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) 2,2-dimethyl-1-nitrobutane
(32) 1,3,5-trichloro-2-nitrobenzene
(33) 1,3,5-trichloro-2,4-dinitrobenzene
(34) 1,2-dichloro-4-nitrobenzene
(35) alpha-Chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) Pentachloro nitrobenzene
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) Ethyl-p-nitrobenzoate
(60) Methyl-o-nitrobenzoate
(61) p-Nitrobenzonitrile
(62) m-Nitrobenzonitrile
(63) 1,4-dinitrocyclohexane
(64) Bis(p-nitrocyclohexyl)methane
(65) 1-nitro-n-hexane
(66) 1,6-dinitro-n-hexane
(67) 1,4-bis(nitromethyl)cyclohexane
(68) 3,3'-dimethoxy-4,4'-dinitro-bisphenyl
(69) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

It should be understood, however, that the aromatic polynitro compounds which are converted to aromatic isocyanates by the process of this invention should have at least two nitro groups in either meta- or para-position. Likewise, if an aromatic nitro-isocyanate compound is employed as a reactant, at least one of the nitro and one of the isocyanato substituents should be in either meta- or para-position to each other.

Also, it should be understood that the aliphatic or cycloaliphatic polynitro compounds which are converted to aliphatic or cycloaliphatic isocyanates by the process of this invention should have at least two nitro groups which are not connected to the same carbon atom or on carbon atoms adjacent to each other. Likewise, if aliphatic or cycloaliphatic nitro-isocyanato compounds are employed as reactants, at least one of the nitro groups should be on a carbon atom which is not substituted by an isocyanato group or a second nitro group and which is not adjacent to a carbon atom substituted by either a nitro group or an isocyanato group. Therefore, if aromatic, cycloaliphatic or aliphatic nitro compounds, which contain as impurities polynitro compounds or nitro-isocyanato compounds which do not meet the above requirements with regard to the positions aof the nitro- or isocyanato- groups, are employed as reactants according to the process of this invention, these impurities are removed as residues and do not contaminate the final isocyanate product.

The process of this invention is particularly effective in the conversion of aromatic nitro compounds to organic isocyanates. As used herein, the term "aromatic nitro compounds" represents those aromatic nitro compounds and substituted aromatic nitro compounds having at least one nitro group atached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy)alkylenes and bis(nitrophenoxy)alkyl ethers. Generally the organic nitro compounds and substituted organic nitro compounds contain between 1 and about 20 carbon atoms, and prefraebly between about 6 and about 14 carbon atoms, especially when the organic nitro compound is an aromatic or substituted aromatic compound.

Catalyst systems which can be utilized in the novel technique of this invention include elements and compounds of elements found in Groups Ib, IIb, IIIa, IVa, IVb, Va, VIa, VIb, VIIa, VIII and the Lanthanide series of the Periodic Table shown on page 122 of Inorganic Chemistry, by Moeller, John Wiley and Sons, Inc. 1952. It was found that certain metals and compounds of these metals have a much greater catalytic effect than others, when compared on an equal weight basis. Those metals, in elemental or compound form, which are preferred because they show the greatest catalytic effect are as follows:

(1) Palladium
(2) Rhodium
(3) Vanadium
(4) Molybdenum
(5) Ruthenium
(6) Tungsten
(7) Tantalum
(8) Chromium
(9) Niobium
(10) Platinum
(11) Cobalt
(12) Nickel
(13) Germanium
(14) Tin
(15) Osmium
(16) Copper
(17) Silver
(18) Iron
(19) Rhenium
(20) Titanium Other metals which may also be employed as a catalyst, either in elemental or in a compound form, but which are less effective than those listed above are as follows:

(1) Aluminum
(2) Scandium
(3) Manganese
(4) Ytterbium
(5) Zinc
(6) Gallium
(7) Yttrium
(8) Zirconium
(9) Masurium
(10) Lutecium
(11) Cadmium
(12) Indium
(13) Lanthanum
(14) Hafnium
(15) Silicon
(16) Erbium
(17) Iridium
(18) Thulium
(19) Gold
(20) Mercury
(21) Thallium
(22) Lead
(23) Cerium
(24) Praseodymium
(25) Neodymium
(26) Illinium
(27) Samarium
(28) Europium
(29) Gadolinium
(30) Terbium
(31) Dysprosium
(32) Holmium Compounds of the above elements which can be utilized in accordance with the process of this invention include oxides, sulfates, nitrates, halides, carbonates, sulfides, oxalates, and the like, and preferably a compound of one of the aforesaid preferred elements. Included in the latter group are platinum oxide, platinum dioxide, platinum dibromide, platinum dichloride, platinum tetrachloride, platinous cyanide, and platinum sulfate; palladium halides such as palladium dibromide, palladium dichloride, palladium difluoride and palladium diiodide; rhodium halides such as rhodium tribromide, rhodium trichloride, rhodium trifluoride, and rhodium triiodide; palladium oxides such as palladium suboxide ($Pd_2O$), palladium monoxide (PdO), and palladium dioxide ($PdO_2$); rhodium oxides such as rhodium monoxide (RhO), rhodium sesquioxide ($Rh_2O_3$), and rhodium dioxide ($RhO_2$); chromic oxide ($Cr_2O_3$), chromic anhydride ($CrO_3$), chromium dioxide ($CrO_2$) and chromous oxide (CrO); molybdenum sesquioxide ($Mo_2O_3$), molybdenum dioxide ($MoO_2$), and molybdenum trioxide ($MoO_3$); ruthenium trichloride ($RuCl_3$), ruthenium pentafluoride ($RuF_5$), ruthenium hydroxide [$Ru(OH)_2$], ruthenium dioxide ($RuO_2$), and ruthenium tetraoxide ($RuO_4$); niobium oxide ($NbO_2$), and niobium pentoxide ($Nb_2O_5$), tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); and vanadium tetraoxide ($V_2O_4$), and vanadium pentoxide ($V_2O_5$), mixtures thereof, and the like.

In addition, carbonyls of certain elements such as nickel, cobalt, iron, rhodium, molybdenum, chromium, tungsten and ruthenium and carbonyl chlorides of certain elements such as palladium, rhodium, ruthenium and any of the aforesaid elements capable of forming carbonyls can be used as the catalyst, especially for converting aromatic nitro compounds to aromatic isocyanates. Mixtures of two or more of these carbonyl compounds may be employed as the catalyst system.

Furthermore, the aforesaid catalyst compositions may be used as a mixture or complex with a Lewis base. The Lewis base used as a compound of the catalyst is preferably a heteroaromatic nitrogen compound containing between five and six members in the ring, containing only nitrogen and carbon in the ring, containing no more than two nitrogen atoms in the ring, and containing at least two double bonds in the ring. Suitable compounds of this type are disclosed in The Ring Index by Patterson and Capell, second edition, American Chemical Society, 1960, and Supplements I, II and III. Derivatives of the heteroaromatic nitrogen compounds may also be utilized. The term "derivatives" when used in conjunction with heteroaromatic compounds throughout the description and claims is intended to include additions to the parent heteroaromatic ring of the following type:

(I) Substituents on the ring
    (a) halides such as chlorine, bromine, iodine and fluorine
    (b) alkyl containing between 1 and 40 carbon atoms
    (c) aryl such as phenyl, cresyl and xylyl
    (d) olefinic such as allyl, vinyl
    (e) hydroxy
    (f) mercapto
    (g) thiocarbamyl
    (h) alkylamino
    (i) cyano
    (j) oximino
    (k) aldehyde
    (l) ethers such as aryl, alkyl, and alkenyl ethers
    (m) thioethers such as aryl, alkyl, and alkenyl ethers
    (n) carboxy
    (o) carbalkoxy
    (p) carbamyl
    (q) carboaryloxy (II) Polycyclic analogues
    (a) fused benzene
    (b) fused cycloaliphatic
    (c) fused nitrogen-containing heteroaromatic (III) Simple salts (IV) Quaternary salts (V) Oxides (VI) Complexes with inorganic substances other than noble metal halides (VII) Mixtures of two or more additions of types I–VI Listed below are typical heteroaromatic nitrogen compounds and derivatives thereof which are suitable for use as components of the catalyst complex of this invention.

(1) Five membered ring containing one nitrogen
    (a) 1-methyl pyrrole
    (b) 1-phenyl pyrrole (2) Five membered ring containing two nitrogens
    (a) imidazole
    (b) 1-methyl imidazole
    (c) pyrazole (3) Fused benzene and fused nitrogen-containing heteroaromatic derivatives of five membered rings containing one nitrogen
    (a) indole
    (b) indolenine (3-pseudoindole)
    (c) 2-isobenzazole
    (d) indolizine
    (e) 4aH-carbazole
    (f) carbazole (4) Six membered ring containing one nitrogen and derivatives thereof
    (a) pyridine
    (b) 2,6-dimethylpyridine
    (c) 2,4,6-trimethylpyridine
    (d) 4-phenylpyridine
    (e) 2-vinylpyridine
    (f) 2-styrylpyridine
    (g) 2-bromopyridine
    (h) 2-chloropyridine
    (i) 3-chloropyridine
    (j) 2,6-dichloropyridine
    (k) 2-bromo-4-methylpyridine
    (l) 2-fluoropyridine
    (m) 2-allyloxypyridine
    (n) 4-phenylthiopyridine
    (o) 2-methoxypyridine
    (p) picolinic acid
    (q) nicotinic acid
    (r) 2,6-dicyanopyridine
    (s) pyridine-2-aldehyde (picolinaldehyde)
    (t) 4-tertiarybutylpyridine
    (u) 4-dimethylaminopyridine
    (v) diphenyl-4-pyridylmethane
    (w) 4-hydroxypyridine
    (x) 2-mercaptopyridine
    (y) 2-oximinopyridine (picolinaldoxime)

(5) Fused benzene and fused nitrogen-containing heteroaromatic derivatives of six membered ring containing one nitrogen
    (a) quinoline
    (b) 2-chloroquinoline
    (c) 8-hydroxyquinoline
    (d) isoquinoline
    (e) acridine
    (f) phenanthridine
    (g) 7,8-benzoquinoline
    (h) 4H-quinolizine
    (i) naphthyridine
    (j) carboline
    (k) phenanthroline
    (l) benzo[h]isoquinoline
    (m) benzo[g]quinoline
    (n) benzo[g]isoquinoline
    (o) benzo[h]quinoline
    (p) benzo[f]quinoline
    (q) benzo[f]isoquinoline
    (r) 1H-benzo[de]quinoline
    (s) 4H-benzo[de]quinoline
    (t) 4H-benzo[de]isoquinoline
    (u) 1H-benzo[de]isoquinoline
    (v) purine
    (w) adenine
    (x) pteridine
    (y) 7H-pyrazino[2,3-c]carbazole
    (z) pyrazino[2,3-d]pyridazine
    (aa) 4H-pyrido[2,3-c]carbazole
    (bb) pyrido[1',2':1,2]imidazo[4,5-b]quinoxaline
    (cc) 6H-perimidine
    (dd) perimidine (6) Six membered ring containing two nitrogens and derivatives thereof
    (a) pyrazine
    (b) 4,6-dimethylpyrimidine
    (c) 2,6-dimethylpyrazine
    (d) pyridazine (7) Fused benzene and fused nitrogen-containing heteroaromatic derivatives of six membered rings containing two nitrogens
    (a) quinoxaline
    (b) 2,3-dimethylquinoxaline
    (c) phthalazine
    (d) quinazoline
    (e) phenazine
    (f) cinnoline (8) Simple salts of heteroaromatic nitrogen compounds or derivatives thereof in sections 1–7 above
    (a) Simple salts include nitrates, hydrohalides, sulfates and acetates of these compounds such as the following:
        (1) pyridine hydrochloride
        (2) 2-chloropyridine-1-oxide hydrochloride
        (3) 4-chloropyridine hydrochloride
        (4) 4,4'-bipyridyl dihydrochloride (9) Quaternary salts of heteroaromatic nitrogen compounds or derivatives thereof of sections 2 and 4–7 above
    (a) Alkyl halides, where alkyl contains 1–40 carbon atoms, acyl halides, and nitroaryl halides, such as:
        (1) 1-methylquinolinium chloride
        (2) laurylpyridinium chloride
        (3) 1-(4-pyridyl) pyridinium chloride hydrochloride

(10) Oxides of heteroaromatic bases and derivatives thereof of sections 2 and 4–7 above
   (a) Oxides include oxides of quinoline, pyridine, isoquinoline and imidazole, and are illustrated by the following oxides:
      (1) pyridine-1-oxide
      (2) 4-bromopyridine-1-oxide
      (3) 2-hydroxypyridine-1-oxide
      (4) picolinic acid-1-oxide
      (5) 4-methoxy pyridine-1-oxide
      (6) 2-bromo-6-methylpyridine-1-oxide
      (7) 2-picoline-1-oxide
      (8) 4-picoline-1-oxide

(11) Complexes of heteroaromatic nitrogen compound with inorganic substances (other than noble metal halides) of sections 2 and 4–7 above.
   (a) Complexes include pyridine, quinoline and isoquinoline complexes illustrated by the following pyridine complexes:
      (1) (pyridine)$_3 \cdot$FeCl$_3$
      (2) pyridine$\cdot$SO$_3$
      (3) pyridine$\cdot$CrO$_3$
      (4) pyridine$\cdot$VCl$_3$
      (5) pyridine$\cdot$V$_2$O$_5$
      (6) pyridine$\cdot$MoO$_3$ As indicated above, heteroaromatic compounds containing only nitrogen and carbon in the ring, such as pyridine, isoquinoline, quinoline and mixtures thereof, are preferably used as the Lewis base, but a heteroaromatic compound which contains only carbon and sulphur or only carbon and oxygen, or carbon and two or more elements selected from the group consisting of nitrogen, sulfur, and oxygen may also be employed as the Lewis base. Typical heteroaromatic compounds, in addition to those mentioned above, include thiophene, dibenzofuran, 2,5-diphenyloxazole, 2-mercaptobenzothiazole, thionaphthene, and the like, may also be used as the Lewis base.

A more complete description of nitrogen-containing heteroaromatic compounds is found in U.S. patent application Ser. No. 691,211, filed Dec. 18, 1967, by Eric Smith and Wilhelm J. Schnabel, now U.S. Pat. No. 3,576,835, issued Apr. 27, 1971. A more complete description of the heteroaromatic compounds containing sulfur, is disclosed in U.S. patent application Ser. No. 709,819, filed Mar. 1, 1968, by Eric Smith. A more complete description of heteroaromatic compounds containing oxygen, and complexes thereof with noble metal compounds is found in U.S. patent application Ser. No. 709,813, filed Mar. 1, 1968, by Eric Smith.

The proportion of catalyst system other than the organic carbonate described below is generally equivalent to between about 0.001 and about 500 percent, and preferably between about 1 and about 100 percent by weight of the organic nitro compound. However, greater or lesser proportions may be employed if desired.

When a heteroaromatic compound is used as a component of the catalyst system, the molar ratio of the heteroaromatic compound to the anion of the metal compound is generally between about 0.1:1 and about 10:1, and preferably between about 0.5:1 and about 1.5:1, but greater or lesser ratios may be employed if desired.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, Fuller's earth, and analogous materials are useful as carriers for this purpose.

Any organic carbonate may be used in the process of this invention provided it has a formula selected from the group consisting of

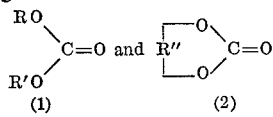

(1)   (2)

In Formula 1, R and R' are each selected from the group consisting of alkyls having 1 to 18 carbon atoms, cyclo alkyls having 3 to 12 carbon atoms, aryl containing 6 to 12 carbon atoms and alkyl substituted aryls where the alkyl is an alkyl having 1 to 12 carbon atoms, halogen substituted aryls, where the halogen is fluorine, chlorine or bromine and where the aryl contains 6 to 12 ring carbon atoms, and mixtures thereof.

In Formula 2, R" is selected from the group consisting of an alkylene containing 2 to 6 carbon atoms, a 1,2-cycloalkylene containing 5 to 12 ring carbon atoms, and an orthoarylene containing 6 to 10 ring carbon atoms.

Suitable alkyl carbonates are as follows: dimethyl carbonate, diethyl carbonate, di-n-hexyl carbonate, di(2-ethylhexyl)carbonate, ethyl-n-hexyl carbonate and di-dodecyl carbonate. Suitable cycloalkyl carbonates are for example: dicyclopentyl carbonate, dicyclohexyl carbonate dicyclooctyl carbonate and dicyclododecyl carbonate.

Suitable aryl carbonates are as follows: diphenyl carbonate, dinaphthyl-(2)-carbonate and dinaphthyl-(3)-carbonate. In addition, suitable alkyl substituted aryl carbonates are as follows: di-o-tolyl carbonate, di-m-tolyl carbonate, di-p-tolyl carbonate, di-p-ethylphenyl carbonate, di-o-octylphenyl carbonate, di-p-octylphenyl carbonate and di-p-dodecylphenyl carbonate. Suitable halogen substituted aryl carbonates include: di-p-chlorophenyl carbonate, di-o-chlorophenyl carbonate, di-m-chlorophenyl carbonate, di-p-fluorophenyl carbonate, di-o-bromophenyl carbonate, di-pentachlorophenyl carbonate, and di-2-chloronaphthyl carbonate.

Compounds of Formula 2 useful in the process of this invention include: ethylene carbonate, trimethylene carbonate, hexamethylene carbonate, cyclopentylene carbonate, cyclohexylene carbonate, cyclododecylene carbonate, phenylene carbonate, tolylene carbonate and naphthylene carbonate.

The organic carbonate of Formula 1 may be one in which R and R' are identical, or it may be one in which R and R' are different substituents. Mixtures of two or more different organic carbonates may be employed if desired.

While any of the aforementioned organic carbonates can be suitably employed in the process of this invention, preferred embodiments employ compounds selected from the group consisting of diphenyl carbonate, diethyl carbonate, di-n-hexyl carbonate, di-cyclohexyl carbonate, dipentachlorophenyl carbonate and the like.

Generally the organic carbonate is employed in an amount between about 0.05 and about 20 mole equivalents and preferably between about 0.1 and about 5 mole equivalents per mole of organic nitro compound. However, greater or lesser amounts can be employed, if desired.

Although the novel technique of this invention is useful in improving all of the aforesaid catalyst systems, it is preferred to use a noble metal-based catalyst, especially a halide thereof.

Noble metals include ruthenium, rhodium, palladium, rhenium osmium, iridium, platinum, silver and gold. It is preferred that the metal be one of the platinum series, including a metal halide selected from the group consisting of halides of palladium, rhodium, platinum, iridium and mixtures thereof. Typical examples of suitable halides include palladous dibromide, palladous dichloride, palladous difluoride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, ruthenium trichloride, ruthenium tetrafluoride, iridium tribromide, iridium tetrabromide, iridium dichloride, iridium trichloride, iridium tetrachloride, iridium triiodide, iridium tetraiodide, and mixtures thereof. Oxides of the noble metals may also be employed and the term "halide of a metal" as used throughout the description and claims is intended to include the above-mentioned metal halides as well as the corresponding oxides, such as palladium oxide, rhodium oxide, platinum oxide, etc., and the like.

More preferably, the catalyst is a mixture or a complex of a noble metal halide and a Lewis base, and the Lewis base is preferably one of the aforesaid nitrogen-containing heteroaromatic compounds. The use of a hydroxyl-substituted hydrocarbon in accordance with the process of this invention is particularly effective using the following catalyst systems:

(1) Dichloro bis(pyridine)palladium
(2) Dichloro bis(isoquinoline)palladium
(3) Palladium dichloride
(4) Rhodium trichloride
(5) Rhodium trichloride+palladium dichloride
(6) Rhodium trichloride+palladium dichloride+molybdenum oxide
(7) Rhodium trichloride+palladium dichloride+vanadium pentoxide
(8) Palladium dichloride+cupric chloride
(9) Rhodium trichloride+isoquinoline
(10) Palladium dichloride+isoquinoline
(11) Rhodium trichloride+pyridine
(12) Palladium dichloride+pyridine
(13) Palladium dichloride+vanadium pentoxide
(14) Rhodium trichloride+vanadium pentoxide The process of this invention operates effectively in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like. In one embodiment of the invention, an organic carbonate, such as cited above, can be used as the solvent.

The proportion of solvent is not critical and any proportion may be employed which will not require excessively large equipment to contain. Generally the weight percent of organic nitro compound in the solvent is in the range between about 2.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I) $R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. In all cases, however the reaction rate is markedly increased, frequently by a 2 to 10 fold increase, when an oxide selected from the group consisting of iron, molybdenum and chromium is used as a component of the catalyst system as described more fully below. Usually between one half hour and 20 hours are required to obtain the desired degree of reaction in a batch technique, but shorter or longer reaction times may be employed. In a continuous process, the reaction may be much faster, i.e., substantially instantaneous, and residence time may be substantially less than batch reaction time.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired a foaming agent. In addition, the organic isocyanates may be used in the preparation of biologically active compounds.

Further improvement in the conversion and yield of organic isocyanates can be obtained by employing a catalyst system which not only contains a catalyst and an organic carbonate, but also contains a third component comprised of certain metal oxides. Oxides suitable as a third component of the catalyst system include at least one oxide of an element selected from the group consisting of iron, molybdenum and chromium. Suitable oxides of this type include chromic oxide ($Cr_2O_3$), chromium dioxide ($CrO_2$), chromic anhydride ($CrO_3$), and chromous oxide (CrO); molybdenum sesquioxide ($Mo_2O_3$), molybdenum dioxide ($MoO_2$), and molybdenum trioxide ($MoO_3$); and ferrous oxide and ferric oxide. Mixtures of two or more of these oxides may be employed as one component of the catalyst mixture. The proportion of the third component of the catalyst system, when one is employed, is generally equivalent to a weight ratio of the metal compound to the metal oxide in the catalyst system generally in the range between about 0.0001:1 and about 25:1, and preferably in the range between about 0.005:1 and about 5:1. The addition of these metal oxides is of course not necessary if they are already a component of the catalyst system.

The following examples are presented to describe the invention more fully without any intention of being limited thereby. All parts and percentages are by weight unless otherwise specified.

EXAMPLES 1-2

A 103 ml. rocking stainless steel autoclave was charged with 3.0 grams of 2,4-dinitrotoluene, 9 ml. of orthodichlorobenzene, 1.2 grams of palladous chloride pyridine complex, and 0.3 gram of molybdenum trioxide. In Example 1, one gram of diphenyl carbonate, and in Example 2, one gram of diethyl carbonate was added to the autoclave with the charge.

In each example, the autoclave was sealed, purged with carbon monoxide, vented, and then pressurized with carbon monoxide to 2750 p.s.i.g. The autoclave and contents were then heated at 200° C. for 30 minutes with agitation. After cooling to room temperature, the autoclave was vented and the reaction mixture was filtered. Analyses of the filtrate by vapor phase chromatography gave values for 2,4-dinitrotoluene conversion, and the yield of 2,4-toluene diisocyanate and total isocyanates (2,4-toluene diisocyanate plus 4-isocyanato-2-nitrotoluene and 2-isocyanato-4-nitrotoluene) as listed in the table.

For purposes of comparison, the procedure of Example 1 and Example 2 was repeated with the exception that no organic carbonate was added during the reaction. The conversion of dinitrotoluene and the yield of toluene diisocyanate and total isocyanates are presented in the table as Comparative Test A (CTA).

The filter cakes of Examples 1 and 2 and Comparative Test A were extracted with hot o-dichlorobenzene. The extracts were cooled to room temperature, the precipitated palladium pyridine chloride complex filtered, dried and weighed. The amounts of undecomposed complex thus recovered are presented in the table.

EXAMPLE 3

The procedure of Examples 1 and 2 was repeated with the exception that no orthodichlorobenzene was added as a solvent, and instead the solvent employed was 9 grams of diethyl carbonate. The conversion of dinitrotoluene and the yields of toluene diisocyanate and total isocyanates are presented int.he table. Infrared analyses of the filtrate showed no absorption in the 6.0–6.1μ region, indicating that no ureas were present, i.e., that no ureas had been formed during the reaction. Palladous pyridine chloride complex was recovered in an amount of 0.95 gram, corresponding to 79.2 percent of undecomposed complex.

and the reaction mixture was filtered at room temperature. Analysis of an aliquot part of the filtrate by vapor phase chromatography indicated a 95.3 percent conversion of the dinitrotoluene charged, a 32.4 percent yield of toluene diisocyanate and a 36.1 percent yield of monoisocyanato mononitrotoluenes.

The remainder of the filtrate was distilled to recover toluene diisocyanate and monoisocyanato mononitrotoluenes. The distillate, the distillation residue and an aliquot of the filter cake were separately subjected to hydrolysis with concentrated hydrochloric acid to convert orthotolylene diisocyanates and other products derived from o-dinitrotoluenes to methyl benzimidazolones. Subsequent analysis by ultra violet spectroscopy and mass spectroscopy revealed that the distillate was free from ortho-isomers of tolylene diisocyanates and other products derived from o-dinitrotoluenes, whereas the presence of methyl benzimidazolone was detected in the hydrolysis product of the residue and of the filter cake.

Extraction of the remainder of the filter cake with hot o-dichlorobenzene, followed by cooling of the extract to room temperature, resulted in the precipitation of palladium pyridine chloride complex which, after filtration and drying, was recovered in an amount corresponding to a 76 percent recovery of undecomposed complex.

For purposes of comparison, the following reaction, identified as "Comparative Test B" (CTB) was performed:

COMPARATIVE TEST B

A 103 ml. rocking stainless steel autoclave was charged with 3.0 g. of 3,4-dinitrotoluene, 5 ml. of orthodichlorobenzene and 0.36 g. of palladous chloride pyridine complex. The reaction with carbon monoxide was conducted as described for Example 4. Analysis of the filtered reaction mixture by vapor phase chromatography showed that 17 percent of the charged 3,4-dinitrotoluene was reacted to give the corresponding diisocyanate in a 21 percent yield.

Comparative Test B shows that when the reaction is carried out with ortho isomers in the absence of an organic carbonate, there is a substantial conversion of the ortho dinitrotoluene to the undesirable ortho toluene diisocyanate. In contrast, Example 4 shows that organic carbonates suppress the formation of these undesirable ortho isocyanates.

| Example Number | Additive | Grams | o-DCB,[1] ml. | DNT.[2] percent conv. | TDI,[3] percent yield | Total isocyanates, percent yield | Catalyst complex recovered, percent |
|---|---|---|---|---|---|---|---|
| 1 | Diphenylcarbonate | 1.0 | 9 | 100 | 56.8 | 60.6 | 84.0 |
| 2 | Diethylcarbonate | 1.0 | 9 | 92.8 | 31.6 | 74.6 | 84.0 |
| CTA [4] | None | | 9 | 100 | 51.5 | 51.5 | 54.0 |
| 3 | Diethylcarbonate (as solvent) | 9.0 | | 94.1 | 30.2 | 65.6 | 79.2 |

[1] Dichlorobenzene.
[2] Dinitrotoluene.
[3] Toluene diisocyanate.
[4] Comparative Test A.

EXAMPLE 4

A rocking stainless steel autoclave was charged with 3.0 g. of crude dinitrotoluene, consisting of 77 percent 2,4-dinitrotoluene, 19 percent 2,6-dinitrotoluene and 3.5 perecnt ortho isomers of dinitrotolulene (3,4 and 2,3-dinitrotoluene), in 5 ml. ortho-dichlorobenzene. Also charged were 1.2 g. of palladium chloride-pyridine complex [Pd(pyr)$_2$Cl$_2$] and 0.5 g. of di-pentachlorophenyl carbonate. The autoclave was sealed, purged with carbon monoxide, vented, and then pressurized with carbon monoxide to 2500 p.s.i.g. The autoclave and contents were then heated at 200° C. for 30 minutes with rocking. After cooling to room temperature, the autoclave was vented

EXAMPLES 5-14

The procedure of Example 4 was repeated with the exception that the organic carbonate was replaced with the following.

| Example: | Organic carbonate |
|---|---|
| 5 | Ethylene carbonate. |
| 6 | Trimethylene carbonate. |
| 7 | Cyclohexenyl carbonate. |
| 8 | Phenylene carbonate. |
| 9 | Tolylene carbonate. |
| 10 | Dimethyl carbonate. |
| 11 | Di-n-hexyl carbonate. |
| 12 | Dicyclohexyl carbonate. |
| 13 | Di-o-tolyl carbonate. |
| 14 | Di-p-fluorophenyl carbonate. |

In each example there was substantial formation of 2,4- and 2,6-diisocyanate, and the product was free of ortho isomers.

Various modifications of the invention, some of which have been referred to above, may be employed without departing from the spirit of this invention.

What is desired to be secured by Letters Patent is:

1. In the process for preparing an aromatic isocyanate by the reaction of an aromatic nitro compound with carbon monoxide at an elevated temperature and elevated pressure in the presence of a catalyst system comprised of
  (I) a mixture of
    (A) a heteroaromatic nitrogen compound having a ring containing
      (1) 5 or 6 members in the ring,
      (2) only nitrogen and carbon in the ring,
      (3) no more than two nitrogen atoms in the ring,
      (4) at least two double bonds in the ring, and
    (B) a halide of a metal selected from the group consisting of
      (1) palladium,
      (2) rhodium,
      (3) iridium,
      (4) platinum,
      (5) ruthenium,
      (6) rhenium, and
      (7) mixtures thereof, or
  (II) a complex of a compound of IA and a halide of IB,
  (III) the improvement which comprises carrying out said reaction in the presence of an organic carbonate selected from the group consisting of
    (A) compounds of the formula

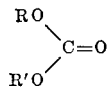

(1) where R and R' are selected from the group consisting of
        (a) alkyls having 1 to 18 carbon atoms,
        (b) cycloalkyls having 3 to 12 carbon atoms,
        (c) aryl containing 6 to 12 carbon atoms,
        (d) alkyl substituted aryls where the alkyl is an alkyl having 1 to 12 carbon atoms and the aryl contains 6 to 12 ring carbon atoms, and
        (e) halogen substituted aryls where the halogen is fluorine, chlorine or bromine and the aryl contains 6 to 12 ring carbon atoms, and
        (f) mixtures thereof, and
    (B) compounds of the formula

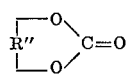

(1) where R" is selected from the group consisting of
        (a) alkylenes containing 2 to 6 carbon atoms,
        (b) 1,2 cycloalkylenes containing 5 to 12 ring carbon atoms, and
        (c) ortho-arylenes containing 6 to 10 ring carbon atoms, (IV) wherein the proportion of said organic carbonate is between about 0.05 and 20 mole equivalents per mole of said aromatic nitro compound.

2. The process of claim 1 wherein the proportion of said organic carbonate is between about 0.1 and about 5 mole equivalents per mole of said aromatic nitro compound.

3. The process of claim 2 wherein said organic carbonate is selected from the group consisting of diphenyl carbonate, diethyl carbonate, di-n-hexyl carbonate, di-cyclohexyl carbonate, and di-pentachlorophenyl carbonate.

4. The process of claim 3 wherein said halide is selected from the group consisting of a halide of palladium and a halide of rhodium.

5. The process of claim 3 wherein said aromatic nitro compound is selected from the group consisting of nitrobenzene, dinitrotoluene, nitroisocyanatotoluene and mixtures thereof.

6. The process of claim 3 wherein said catalyst system contains an oxide of an element selected from the group consisting of molybdenum, vanadium, chromium and iron.

7. The process of claim 3 wherein said heteroaromatic nitrogen compound is selected from the group consisting of pyridine, isoquinoline, quinoline and mixtures thereof.

8. The process of claim 7 wherein said halide is selected from the group consisting of a halide of palladium and a halide of rhodium.

9. The process of claim 8 wherein the molar ratio of said heteroaromatic nitrogen compound to the anion of said halide is in the range of between about 0.1:1 and about 10:1, and the proportion of said catalyst system is between about 0.001 and about 500 weight percent of said aromatic nitro compound.

10. The process of claim 9 wherein said aromatic nitro compound is selected from the group consisting of nitrobenzene, dinitrotoluene, nitroisocyanatotoluene, and mixtures thereof.

11. The process of claim 10 wherein said catalyst system is a mixture of palladous chloride pyridine and molybdenum trioxide, and said organic carbonate is diphenyl carbonate.

12. The process of claim 10 wherein said catalyst system is a mixture of palladous chloride pyridine and molybdenum trioxide and said organic carbonate is diethylcarbonate.

13. The process of claim 10 wherein said catalyst system is a palladous chloride pyridine complex and said organic carbonate is dipentachlorophenyl carbonate.

14. The process of claim 10 wherein said catalyst system is a palladous chloride pyridine complex and said organic carbonate is di-n-hexyl carbonate.

15. The process of claim 10 wherein said catalyst system is a palladous chloride pyridine complex and said organic carbonate is di-cyclohexyl carbonate.

References Cited

UNITED STATES PATENTS

| | | | |
|---|---|---|---|
| 2,885,423 | 5/1959 | Spiegler | 260—453 |
| 3,461,149 | 8/1969 | Hardy et al. | 260—453 |
| 3,523,965 | 8/1970 | Nober et al. | 260—453 |

JOSEPH REBOLD, Primary Examiner

D. H. TORRENCE, Assistant Examiner

U.S. Cl. X.R.

252—429 A, 429 C